US007009919B2

(12) United States Patent
Matsuda

(10) Patent No.: US 7,009,919 B2
(45) Date of Patent: Mar. 7, 2006

(54) OPTICAL PICKUP APPARATUS EMPLOYING A GRATING AND A HOLOGRAM THAT GENERATE MULTIPLE BEAMS DETECTED BY A PHOTODETECTOR

(75) Inventor: Takehiro Matsuda, Saitama (JP)

(73) Assignee: Pioneer Corporation, Tokyo (JP)

( * ) Notice: Subject to any disclaimer, the term of this patent is extended or adjusted under 35 U.S.C. 154(b) by 507 days.

(21) Appl. No.: 09/885,167

(22) Filed: Jun. 21, 2001

(65) Prior Publication Data
US 2002/0093893 A1 Jul. 18, 2002

(30) Foreign Application Priority Data
Jun. 21, 2000 (JP) ............................ P.2000-185796

(51) Int. Cl.
G11B 7/00 (2006.01)
(52) U.S. Cl. .............................. 369/44.41; 369/112.05; 369/120; 369/121
(58) Field of Classification Search ............. 369/44.26, 369/44.27, 44.29, 44.35, 44.37, 44.41, 112.05, 369/112.04, 112.07, 112.1, 120, 121
See application file for complete search history.

(56) References Cited

U.S. PATENT DOCUMENTS 5,717,674 A * 2/1998 Mori et al. ............... 369/112.1
5,912,868 A * 6/1999 Hayashi et al. ............. 369/118
6,366,548 B1 * 4/2002 Ohyama ................ 369/112.04

FOREIGN PATENT DOCUMENTS

JP 09-120568 5/1997
JP 10-255274 9/1998

* cited by examiner

Primary Examiner—Paul W. Huber
(74) Attorney, Agent, or Firm—Sughrue Mion, PLLC

(57) ABSTRACT

An optical pickup is provided which can read information from a plurality of recording mediums having different wavelengths without the need for a mixing prism. The optical pickup is comprised of a light emission part, a grating, a hologram and a light receiving part. The light emission part emits first and second laser beams having different wavelengths from each other. The grating generates a pair of sub-beams from the laser beam emitted from the light emission part. The hologram generates first and second high-order beams from the laser beam reflected by a recording medium to guide the high-order beams to the light receiving part. The light receiving part receives the first and second high-order beams generates a focus error signal and a tracking error signal which enables the information to be correctly read from the different recording mediums.

10 Claims, 14 Drawing Sheets

OPTICAL PICKUP APPARATUS EMPLOYING A GRATING AND A HOLOGRAM THAT GENERATE MULTIPLE BEAMS DETECTED BY A PHOTODETECTOR

BACKGROUND OF THE INVENTION

1. Field of the Invention

The present invention relates to an optical pickup apparatus enable to read two or more kinds of recording medium having different reading wavelengths such as a compatible optical pickup apparatus for DVD/CD, and particularly relates to an optical pickup apparatus using a semiconductor laser element formed of a one-chip laser diode for emitting two laser beams having different wavelengths.

2. Description of the Related Art

Conventionally, a DVD/CD compatible reproducing apparatus for sharing an optical pickup of a CD reproducing apparatus and a DVD reproducing apparatus has actively been proposed. The applicant has also proposed an optical pickup apparatus enabling to reproduce both the DVD and CD, which is disclosed in JP-A-10-255274, so that these configurations and operations will be described briefly referring to FIG. 18.

An optical pickup apparatus comprises a first light source 10 for emitting a laser beam having a wavelength (780 nm) most suitable for an information reading from a CD, a first driving circuit 11 for driving the first light source 10, a second light source 14 for emitting a laser beam having a wavelength (650 nm) most suitable for an information reading from a DVD, a second driving circuit 15 for driving the second light source 14, a first beam splitter 12 for reflecting the laser beam emitted from the first light source 10 and transmitting the laser beam emitted from the second light source 14, a second beam splitter 13 for transmitting the laser beam reflected or transmitted by the first beam splitter 12 and reflecting a laser beam reflected by an optical disk 18 to guide the laser beam to a photodetector 20 through a condenser lens 19, an objective lens 16 for gathering the laser beam reflected or transmitted by the first beam splitter 12 on an information recording surface, an information data reproducing circuit 21 for generating an electrical signal with a level corresponding to the quantity of light of the light applied to the photodetector 20 to output the signal as a reading signal, a disk determination circuit 22 for determining a kind of the optical disk 18 based on a size of a beam spot formed at the time of applying a laser beam to the optical disk 18 to output a signal of the kind, and a controller 23 for selectively driving the first and second light sources 10, 14 based on the signal of the disk determination circuit 22.

In FIG. 18, the first light source 10 emits the laser beam (shown by a broken line) having the wavelength (780 nm) most suitable for the information reading from the CD according to a driving signal from the first driving circuit 11 and applies the laser beam to the first beam splitter 12. The first beam splitter 12 reflects the laser beam from the first light source 10 to guide the reflected light to the second beam splitter 13.

On the other hand, the second light source 14 placed at a 90° angle with respect to the first light source 10 emits the laser beam (shown by a solid line) having the wavelength (650 nm) most suitable for the information reading from the DVD according to a driving signal from the second driving circuit 15 and applies the laser beam to the first beam splitter 12. The first beam splitter 12 transmits the laser beam from the second light source 14 to guide the laser beam to the second beam splitter 13.

The second beam splitter 13 guides the laser beam supplied through the first beam splitter 12, namely the laser beam from the first light source 10 or the second light source 14 to the objective lens 16. The objective lens 16 gathers the laser beam from the second beam splitter 13 at one point to use the laser beam as information reading light and the light is applied to an information record surface of the optical disk 18 rotated and driven by a spindle motor 17.

The laser beam from the first light source 10 (shown by the broken line) is gathered by the objective lens 16 so as to focus on an information recording surface C of the optical disk 18. Also, the laser beam from the second light source 14 (shown by the solid line) is gathered by the objective lens 16 so as to focus on an information recording surface D of the optical disk 18.

The reflected light occurring by applying information reading light from the objective lens 16 to the optical disk 18 passes through the objective lens 16 and is reflected by the second beam splitter 13, and a beam spot gathered by the condenser lens 19 is applied to the photodetector 20. The photodetector 20 generates the electrical signal with the level corresponding to the quantity of light of the applied light and supplies the signal to the information data reproducing circuit 21 and the disk determination circuit 22 as a reading signal.

The information data reproducing circuit 21 generates a digital signal based on the obtained reading signal and further performs demodulation and error correction to the digital signal and reproduces information data. The disk determination circuit 22 identifies a kind of the optical disk 18, for example, based on a size of a beam spot formed at the time of applying a laser beam to the optical disk 18 and supplies the kind to the controller 23. According to the disk identification signal, the controller 23 controls any one of the first driving circuit 11 and the second driving circuit 15 in order to selectively bring about a drive state.

The controller 23 drives only the first driving circuit 11 when a disk kind signal indicating the CD is obtained from the disk determination circuit 22. Therefore, the laser beam emitted from the first light source 10 is applied to the optical disk 18 through the optical system comprising the first beam splitter 12, the second beam splitter 13 and the objective lens 16. Also, only the second driving circuit 15 is driven when a disk kind signal indicating the DVD is obtained from the disk determination circuit 22.

Therefore, the laser beam emitted from the second light source 14 is applied to the optical disk 18 through the optical system comprising the first beam splitter 12, the second beam splitter 13 and the objective lens 16. That is, the first light source 10 for generating the laser beam having the wavelength most suitable for the information reading from the optical disk 18 with a relatively low recording density as the CD and the second light source 14 for generating the laser beam having the wavelength most suitable for the information reading from the optical disk 18 with a high recording density as the DVD are provided, and the light source is selectively driven corresponding to the kind of the optical disk 18 targeted for reproduction.

As described above, the DVD/CD compatible reproducing apparatus requiring two light sources requires a mixing prism to increase a cost compared with an optical pickup apparatus having one light source and also, when the first light source 10 is applied from one side of the first beam splitter 12, it is necessary to apply the second light source 14 from the other side perpendicular to the first light source 10 and thus, there was a problem that space for placing an optical system widens and the optical pickup apparatus jumboizes.

SUMMARY OF THE INVENTION

The invention is implemented in view of the above-described problem, and an object of the invention is to provide an optical pickup apparatus in correspondence with two wavelengths enabling to achieve miniaturization without using the mixing prism.

In order to solve the problem, according to a first aspect of the invention, there is provided an optical pickup apparatus enabling to read information of a plurality of recording mediums having different reading wavelengths from each other, comprising:

a light emission part including a first light emission source for emitting a first laser beam and a second light emission source for emitting a second laser beam having a wavelength different from that of the first laser beam, the second light emission source integrally formed with the first light emission source and placed adjacent to the first light emission source, the light emission part controlled to selectively emit the first or second laser beam as a laser beam;

a grating for generating a pair of sub-beams from the laser beam;

a hologram for generating first high-order beams from the laser beam reflected by a recording medium and second high-order beams from the pair of the sub-beams reflected by the recording medium; and a light receiving part for receiving the first and second high-order beams to generate a focus error signal and a tracking error signal.

In a second aspect of the invention, there is provided the optical pickup apparatus according to the first aspect of the invention, wherein the focus error signal is generated by a beam size method; and the tracking error signal is generated by a three-beam method.

In a third aspect of the invention, there is provided the optical pick up apparatus according to the first aspect of the invention, wherein the light receiving part comprises:

a pair of three-division light receiving elements; and
two pairs of sub-beam receiving elements;

the pair of three-division light receiving elements receive the first high-order beams to generate the focus error signal; and the two pairs of sub-beam light receiving elements are provided by one pair with respect to each of the three-division light receiving elements, and receive the second high-order beams to generate the tracking error signal.

In a fourth aspect of the invention, there is provided the optical pickup apparatus according to the third aspect of the invention, wherein each of the three-division light receiving elements is divided into three light receiving regions by two parallel division lines; and each pair of the sub-beam light receiving elements is aligned and placed in a direction perpendicular to the division lines of the three-division light receiving elements.

In a fifth aspect of the invention, there is provided the optical pickup apparatus according to the fourth aspect of the invention, wherein the light emission part is placed so that a straight line connecting light emission points of the first and second light emission sources is parallel to the division lines of the three-division light receiving element.

In a sixth aspect of the invention, there is provided the optical pickup apparatus according to the fourth aspect of the invention, wherein the hologram is placed so that a straight line connecting incident points of the first high-order beams onto the light receiving part is parallel to the division lines of the three-division light receiving elements.

In a seventh aspect of the invention, there is provided the optical pickup apparatus according to the fourth aspect of the invention, wherein the grating is placed so that a straight line connecting the pair of sub-beams is perpendicular to the division lines of the three-division light receiving elements.

In eighth aspect of the invention, there is provided the optical pickup apparatus according to the first aspect of the invention, wherein the light receiving part comprises:

a first pair of three-division light receiving elements;
a second pair of three-division light receiving elements;
a first pair of sub-beam light receiving elements; and
a second pair of sub-beam light receiving elements;

when the first laser beam is emitted from the light emission part as the laser beam, the first pair of the three-division light receiving elements receive the first high-order beams to generate the focus error signal;

the first pair of the sub-beam light receiving elements receive the second high-order beam generated from one of the pair of the sub-beams;

the second pair of the three-division light receiving elements receive the second high-order beams generated from the other of the pair of sub-beams; and the first pair of the sub-beam light receiving elements and the second pair of the three-division light receiving elements generate the tracking error signal; and when the second laser beam is emitted from the light emission part, the first pair of the three-division light receiving elements receive the second high-order beams generated from one of the pair of the sub-beams;

the second pair of the three-division light receiving elements receive the first high-order beams to generate the focus error signal;

the second pair of the sub-beam light receiving elements receive the second high-order beams generated from the other of the pair of sub-beams; and the first pair of the three-division light receiving elements and the second pair of the sub-beam light receiving elements generate the tracking error signal.

In ninth aspect of the invention, there is provided the optical pickup apparatus according to the first aspect of the invention, wherein the light receiving part comprises:

a pair of four-division light receiving elements for receiving the first high-order beams to generate the focus error signal; and two pairs of sub-beam light receiving elements provided by one pair with respect to each of the pair of the four-division light receiving elements, the two pairs of sub-beam light receiving elements for receiving the second high-order beams to generate the tracking error signal, the first high-order beams are received by continuous three light receiving regions of the four-division light receiving elements; and the continuous three light receiving regions for receiving the first high-order beams generated from the first laser beam are different in part from those for receiving the first high-order beams generated from the second laser beam.

In a tenth aspect of the invention, there is provided the optical pickup apparatus according to any one of eighth and ninth aspects of the invention, wherein the light emission part is placed so that a straight line connecting light emission points of the first and second light emission sources is perpendicular to a surface on which the light receiving part is provided.

BREIF DESCRIPTION OF THE DRAWINGS

DETAILED DESCRIPTION OF THE PREFERRED EMBODIMENTS

Embodiments according to the invention will be described below using an optical pickup apparatus for reproducing a DVD and a CD or a CDR having different reading wavelengths as an example. Incidentally, recording medium to be reproduced are not limited to the above described and the invention can be applied as long as an optical pickup apparatus reproduces a plurality of disks having different reading wavelength from each other.

Figure 1:
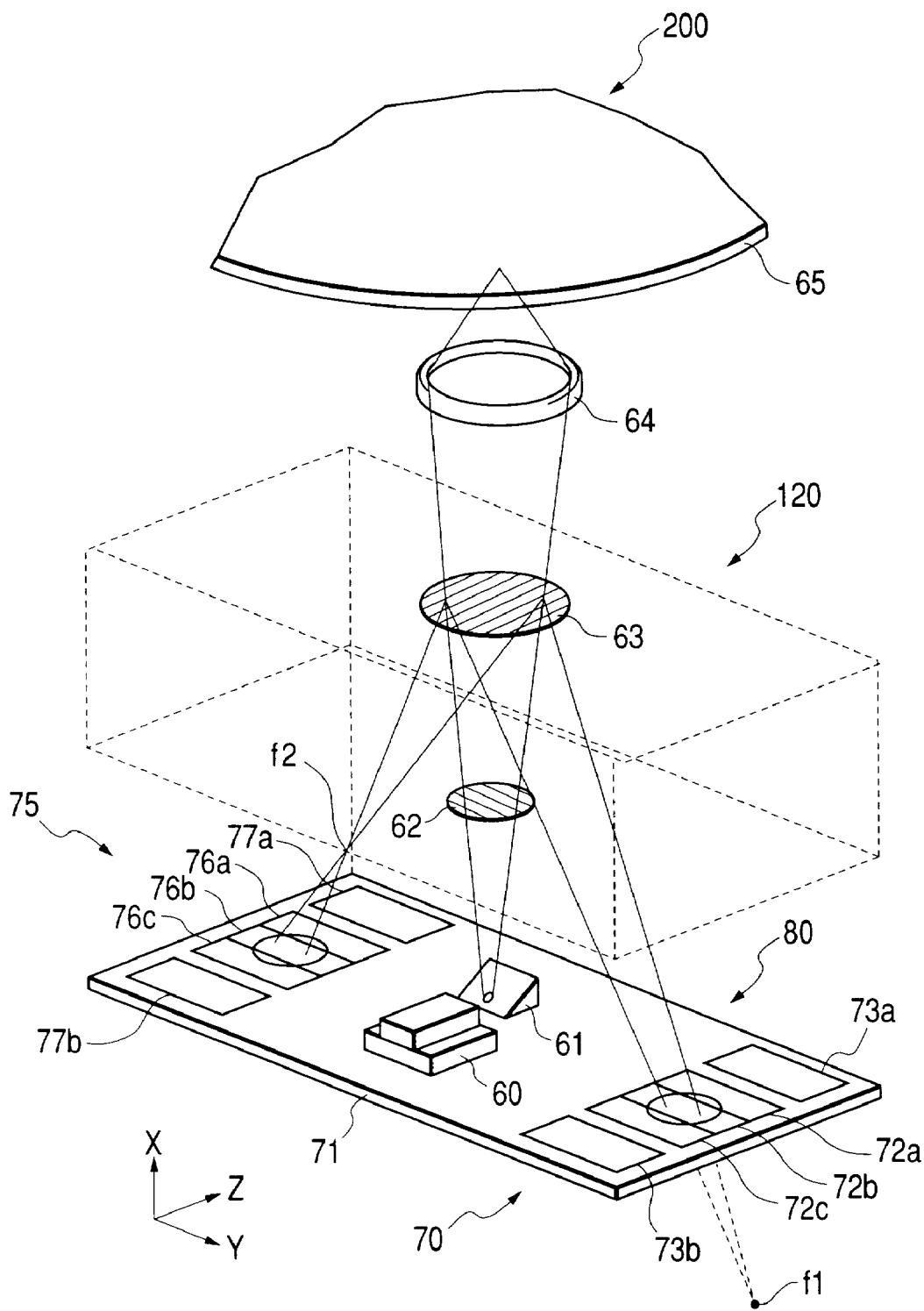
FIG. 1 is a main perspective view of an optical pickup apparatus according to a first embodiment of the invention.

FIG. 1 is a main perspective view of an optical pickup apparatus 200 according to a first embodiment of the invention and a configuration of the optical pickup apparatus 200 will be described on the basis of the drawing.

The optical pickup apparatus 200 comprises a semiconductor laser element 60 which is a light emission part for emitting first and second laser beams having different wavelengths, a reflective mirror 61 for reflecting the laser beam emitted from the semiconductor laser element 60 to guide the laser beam toward an optical disk 65, a grating 62 for generating a pair of sub-beams for tracking error generation from the laser beam reflected by the reflective mirror 61, a hologram 63 for transmitting the laser beam reflected by the reflective mirror 61 to guide the laser beam to the optical disk 65 and also generating + first-order light and − first-order light from the laser beam reflected by an information recording surface of the optical disk 65 and varying a focal length to guide the laser beams to a pair of first and second light detection parts 70, 75, which are light receiving parts, and an objective lens 64 for gathering the laser beam to form a proper beam spot on the information recording surface.

Incidentally, in the optical pickup apparatus 200 according to the first embodiment, a light receiving/emitting part 80 constructed on a semiconductor substrate 71 by including the semiconductor laser element 60, which is the light emission part, and the first and second light detection parts 70, 75, which are the light receiving parts, the grating 62 provided in a plane substantially perpendicular to an optical axis of the objective lens, and the hologram 63 provided to have a predetermined distance from the grating 62 and to be substantially parallel to the grating 62 may be fixed within a cabinet in a predetermined position relation to be unified so as to facilitate an assembly process.

The light receiving/emitting part 80 comprises the semiconductor laser element 60 provided on the approximately center of the semiconductor substrate 71, the reflective mirror 61 having a triangular cylinder shape provided in front of the semiconductor laser element 60 in order to change the laser beam emitted from the semiconductor laser element 60 to +Z direction in the drawing into incident light toward a direction perpendicular to the semiconductor substrate 71, the first light detection part 70 including one three-division detector 72, which is a three-division light receiving element for receiving a main beam of + first-order light of the laser beam in one side (+Y direction, which is an arrow direction in the drawing) of the semiconductor laser element 60 to generate a focus error signal by a beam size method, and a pair of sub-detectors 73a, 73b for receiving a sub-beam of +first-order light in both sides (Z direction in the drawing parallel to a track) of the three-division detector 72 to generate a tacking error signal by a three-beam method, and the second light detection part 75 including the other three-division detector 76 for receiving a main beam of − first-order light of the laser beam in the other side (−Y direction in the drawing) of the semiconductor laser element 60 and a pair of sub-detectors 77a, 77b for receiving a sub-beam of − first-order light in both sides (Z direction in the drawing) of the three-division detector 76. The three-division detectors 72 and 76 include light receiving regions 72a, 72b, 72c and 76a, 76b, 76c divided into three portions as shown in the drawing, and are placed so that these division lines become parallel to a direction of a straight line connecting first and second light emission sources 36, 40 of the semiconductor laser element 60 described below (Y direction in the drawing).

Figure 2:
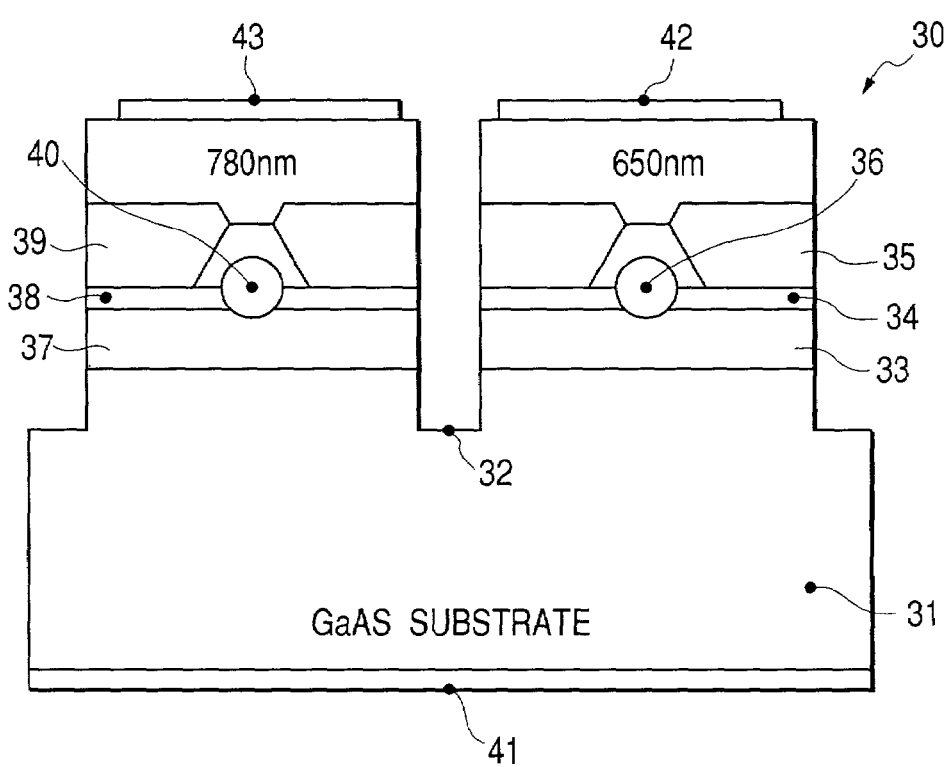
FIG. 2 is a sectional view of a one-chip laser diode.
Figure 3:
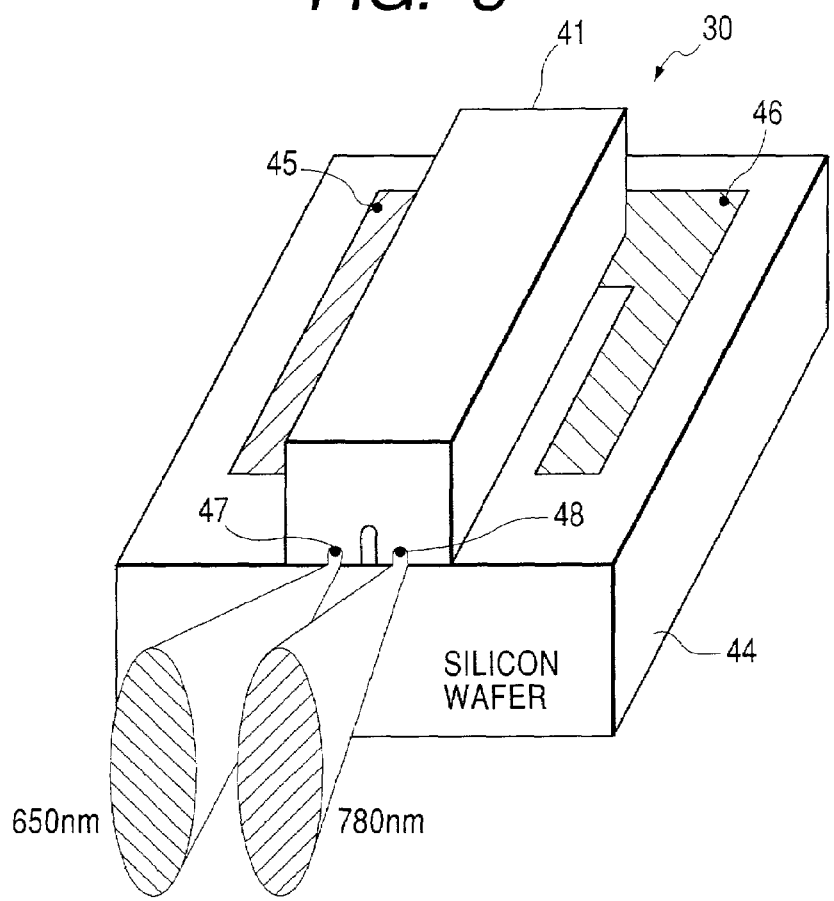
FIG. 3 is a sub-mount view of a one-chip laser diode 30.

Also, the semiconductor laser element 60 is a one-chip laser diode 30 for emitting two wavelengths, which are a first laser beam having a wavelength of 650 nm for DVD reading and a second laser beam having a wavelength of 780 nm for CD and CDR reading. A structure of the laser diode will be described referring to FIGS. 2 and 3. FIG. 2 is a sectional view of the one-chip laser diode 30 and FIG. 3 is a sub-mount view of the one-chip laser diode 30.

As shown in FIG. 2, the one-chip laser diode 30 has a structure in which an n-type $Al_XGa_YIn_{1-X-Y}P$ layer 33, an $Al_XGa_YIn_{1-X-Y}P$ active layer 34, and a p-type $Al_XGa_YIn_{1-X-Y}P$ layer 35 are stacked on a GaAs substrate 31 with an outer size of the order of 300 μm×400 μm×100 to 120 μm and a first light emission part 36 acting as a first light emission source for emitting the first laser beam with a wavelength of 650 nm is formed in the center of the active layer 34 and also an n-type $Al_XGa_{1-X}As$ layer 37, an $Al_XGa_{1-X}As$ active layer 38, and a p-type $Al_XGa_{1-X}As$ layer 39 are stacked and a second light emission part 40 acting as a second light emission source for emitting the second laser beam with a wavelength of 780 nm is formed in the center of the active layer 38 and the two active layers 34, 38 with a thickness of about 4 μm are isolated by an isolated trench 32. Therefore, the first light emission part 36 and the second light emission part 40 have a structure spaced about 100 μm apart by the isolated trench 32.

In the one-chip laser diode 30, a common electrode 41 is formed on the bottom side of the GaAs substrate 31 and Au electrodes 42, 43 are formed on the top side of the first and second light emission sources 36, 40, respectively. As shown in FIG. 3, the one-chip laser diode 30 is used as the semiconductor laser element 60 in sub-mount form placed on a silicon wafer 44 on which an Au electrode 45 for the first light emission source 36 and an Au electrode 46 for the second light emission source 40 are formed. That is, the one-chip laser diode 30 having the common electrode 41 directed upward is placed on the silicon wafer 44, and the Au electrode 42 is soldered to the Au electrode 45 for the first light emission source 36 and the Au electrode 43 is soldered to the Au electrode 46 for the second light emission source 40, respectively and lead wires (not shown) is soldered to the common electrode 41 and the two Au electrodes 45, 46 to use.

Then, the first laser beam having the wavelength of 650 nm is emitted from a light emission window 47 when a predetermined voltage is applied between the common electrode 41 and the Au electrode 45, and the second laser beam having the wavelength of 780 nm is emitted from a light emission window 48 when a predetermined voltage is applied between the common electrode 41 and the Au electrode 46.

Figure 4:
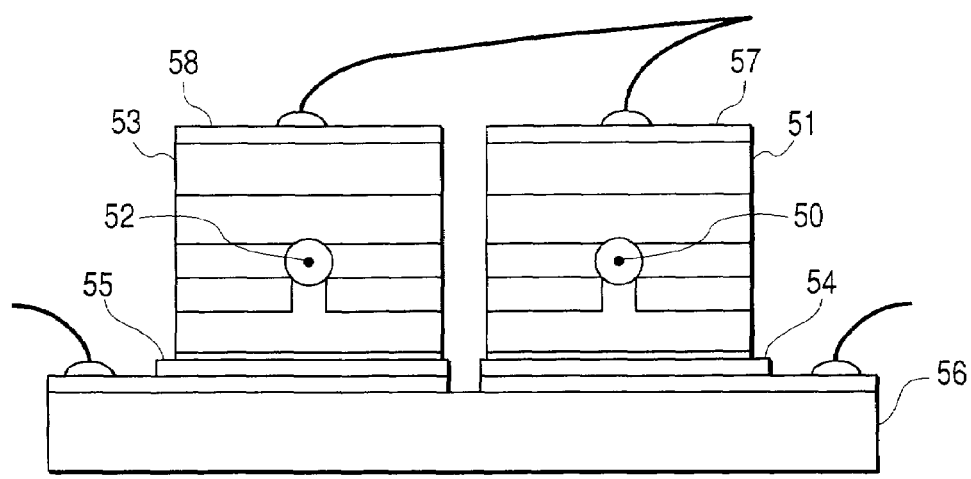
FIG. 4 is a configuration view of a two-wavelength laser element of hybrid type.

The semiconductor laser element 60 may be formed of a two-wavelength laser element of hybrid type shown in FIG. 4 other than the one-chip laser diode 30 constructed so that laser beams of two wavelengths can be outputted by fabricating two active layers of different kinds on a one-chip with a selective growth method. In the two-wavelength laser element of hybrid type, a first semiconductor laser element 51 having a first light emission source 50 and a second semiconductor laser element 53 having a second light emission source 52 fabricated separately are placed on an S1 substrate 56, on which electrodes 54, 55 are formed, by a dedicated assembly apparatus and are fixed by heat fusion. Then, Au wires are bonded to the two electrodes 54, 55 and electrodes 57, 58 formed on the top of the first semiconductor laser element 51 and the second semiconductor laser element 53 to use. For the hybrid type, it is difficult to narrow a distance between the first light emission source 50 and the second light emission source 52 compared with the one-chip laser diode 30 described above and it is also difficult to keep accuracy of the distance. However, in the invention, the two-wavelength laser element of hybrid type is also an target.

Figure 5:
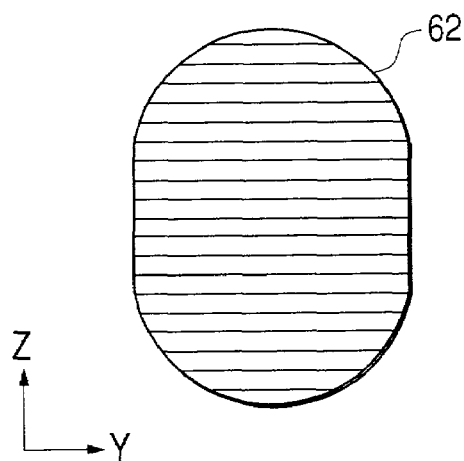
FIG. 5 is a structure view of a grating.

Next, structures of the grating 62 and the hologram 63 constructing a hologram unit 100 will be described referring to FIGS. 5 and 6. The grating 62, as shown in FIG. 5, is substantially parallel to a straight line connecting the first and second light emission sources 36, 40 of the semiconductor laser element 60, and is formed of a diffraction grating having regular intervals (about 5 μm) in a perpendicular direction (that is, Z direction in the drawing).

Figure 6:
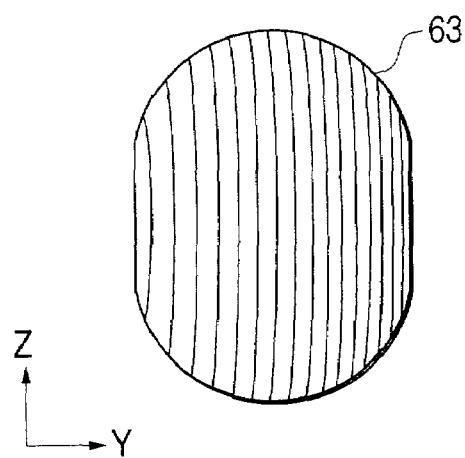
FIG. 6 is a structure view of a hologram.

The hologram 63, as shown in FIG. 6, is formed of a diffraction grating bent in a direction perpendicular to the straight line connecting the first and second light emission sources 36, 40. Intervals of the diffraction grating change continuously from about 1 μm to about 2 μm from the first light emission source 36 toward the second light emission source 40 (−Y direction in the drawing). Using such a hologram 63, focal lengths of + first-order light and − first-order light generated by the hologram 63 can be different from each other. Thus, as shown in FIG. 1, + first-order light of the laser beam is focused so as to focus on a position of f1 to form a beam spot on the first light detection part 70, and − first-order light of the laser beam is focused so as to focus on a position of f2 to form a beam spot on the second light detection part 75. Then, when a focus servo adjustment is made properly, a beam spot size on the first light detection part 70 is formed equally to a beam spot size on the second light detection part 75.

As the above described, in the embodiment, a focus servo adjustment is made by the beam size method and a tracking servo adjustment is made by the three-beam method.

Figure 7:
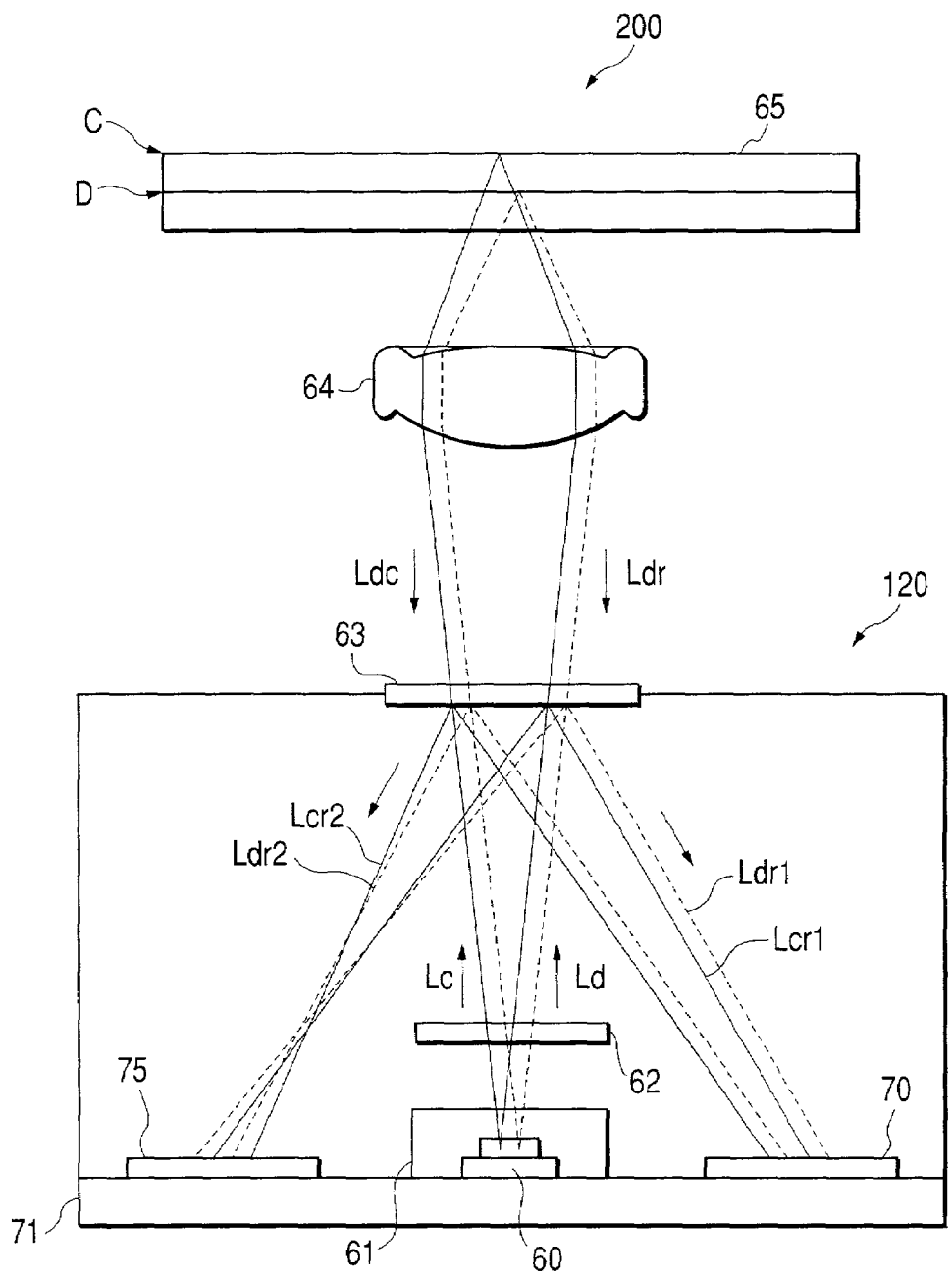
FIG. 7 is a configuration view of the optical pickup apparatus according to the first embodiment of the invention.

Next, operations in case of reproducing a DVD and a CD as a recording medium will be described referring to FIGS. 7 and 8. FIG. 7 is a configuration view of the optical pickup apparatus 200 according to the first embodiment of the invention, and electric circuits such as a driving circuit of the semiconductor laser element 60, a disk determination circuit, and the like are identical to the circuits according to the related art and are omitted. The optical pickup apparatus 200 according to the first embodiment is constructed to conduct the same disk determination as the related art and selectively driving only one of the light emission sources of the semiconductor laser element 60 based on a result of the disk determination, so that an optical path of the first laser beam and an optical path of the second laser beam are not formed at the same time. In the semiconductor laser element 60, the first light emission source 36 for emitting the first laser beam having the wavelength of 650 nm and the second light emission source 40 for emitting the second laser beam having the wavelength of 780 nm are formed on the same chip at a distance of about 100 μm as described above, so that the optical path (shown by a broken line in the drawing) of the first laser beam does not accurately match with the optical path (shown by a solid line in the drawing) of the second laser beam and the paths are formed with some deviation.

Hence, in the drawings of the specification, explanation is made easy to understand by describing all the optical paths of incident light Ld, Lc of the first and second laser beams, optical paths of return light Ldr, Lcr of the first and second laser beams reflected by an information recording surface, optical paths of return light Ldr1, Lcr1 of the first and second laser beams diffracted as + first-order light by the hologram 63, and optical paths of return light Ldr2, Lcr2 of the first and second laser beams diffracted as − first-order light by the hologram 63 within the same drawing.

Figure 8:
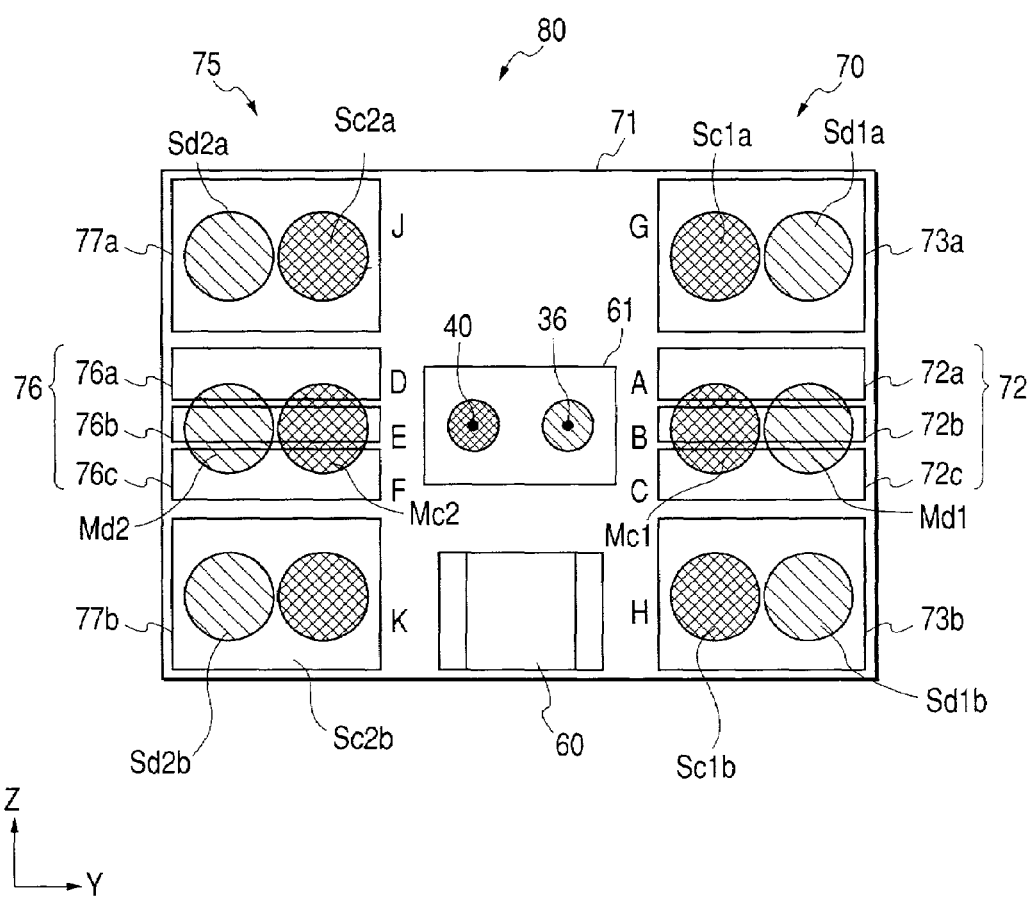
FIG. 8 is a plan view of a light receiving/emitting part constructing the optical pickup apparatus according to the first embodiment.

FIG. 8 is a plan view of the light receiving/emitting part 80, and explanation is made easy to understand by describing a beam spot formed at the time of reproducing a DVD and a beam spot formed at the time of reproducing a CD in the first and second light detection parts 70, 75 on the same drawing and showing the beam spot of the first laser beam by a circle mark with slash and showing the beam spot of the second laser beam by a circle mark with cross.

In case of reproducing the optical disk 65 of the DVD, incident light Ld (shown by the broken line in the drawing) of the first laser beam emitted from the semiconductor laser element 60 is reflected by the reflective mirror 61 to be incident on the objective lens 64 through the grating 62 and the hologram 63. The objective lens 64 gathers the first laser beam on an information recording surface D of the optical disk 65. Then, return light Ldr of the first laser beam reflected by the information recording surface D of the DVD is incident on the hologram 63 through the objective lens 64.

The hologram 63 forms a main beam spot Md1 of return light Ldr1, which is a deflected + first-order light of the first laser beam, on the three-division detector 72 of the first light detection part 70 and forms a pair of sub-beam spots Sd1a, Sd1b of the return light Ldr1 on a pair of the sub-detectors 73a, 73b, respectively. The hologram 63 forms a main beam spot Md2 of return light Ldr2, which is a deflected − first-order light of the first laser beam, on the three-division detector 77 of the second light detection part 75 and forms a pair of sub-beam spots Sd2a, Sd2b of the return light Ldr2 on a pair of the sub-detectors 77a, 77b, respectively.

On the other hand, in case of reproducing the optical disk 65 of the CD, incident light Lc (shown by the solid line in the drawing) of the second laser beam emitted from the semiconductor laser element 60 is reflected by the reflective mirror 61 to be incident on the objective lens 64 through the grating 62 and the hologram 63. The objective lens 64 gathers the second laser beam on an information recording surface C of the optical disk 65. Then, return light Lcr of the second laser beam reflected by the information recording surface C of the CD is incident on the hologram 63 through the objective lens 64. The hologram 63 forms a main beam spot Mc1 of return light Lcr1, which is a deflected + first-order light of the second laser beam, on the three-division detector 72 of the first light detection part 70 and forms a pair of sub-beam spots Sc1a, Sc1b of the return light Lcr1 on a pair of the sub-detectors 73a, 73b, respectively. The hologram 63 forms a main beam spot Mc2 of return light Lcr2, which is a deflected − first-order light of the second laser beam, on the three-division detector 77 of the second light detection part 75 and forms a pair of sub-beam spots Sc2a, Sc2b of the return light Lcr2 on a pair of the sub-detectors 77a, 77b, respectively.

As shown in FIG. 8, each of the beam spots Md1, Sd1a, Sd1b by + first-order light of the first laser beam and of each the beam spots Mc1, Sc1a, Sc1b by + first-order light of the second laser beam are formed on the first light detection part 70. At this time, the first laser beam differs from the second laser beam in wavelength, so that diffraction angles in the hologram 63 differ and the laser beam having a long wavelength of 780 nm is diffracted at a large angle. Positions of the first light emission source 36 and the second light emission source 40 of the semiconductor laser element 60 are formed apart in the Y direction, so that each of the beam spots Md1, Sd1a, Sd1b by the first laser beam and each of the beam spots Mc1, Sc1a, Sc1b by the second laser beam are formed to be apart from each other in the Y direction, respectively. Similarly, each of the beam spots Md2, Sd2a, Sd2b by − first-order light of the first laser beam and each of the beam spots Mc2, Sc2a, Sc2b by − first-order light of the second laser beam are formed on the first light detection part 70, and are formed to be apart from each deviate in the Y direction.

Therefore, the first and second light detection parts 70, 75 constructing the light receiving/emitting part 80 according to the first embodiment are constructed so as to enlarge a light receiving region of the Y direction compared with system according to the related art constructed by an optical pickup apparatus with one light source or using a mixing prism.

Figure 9:
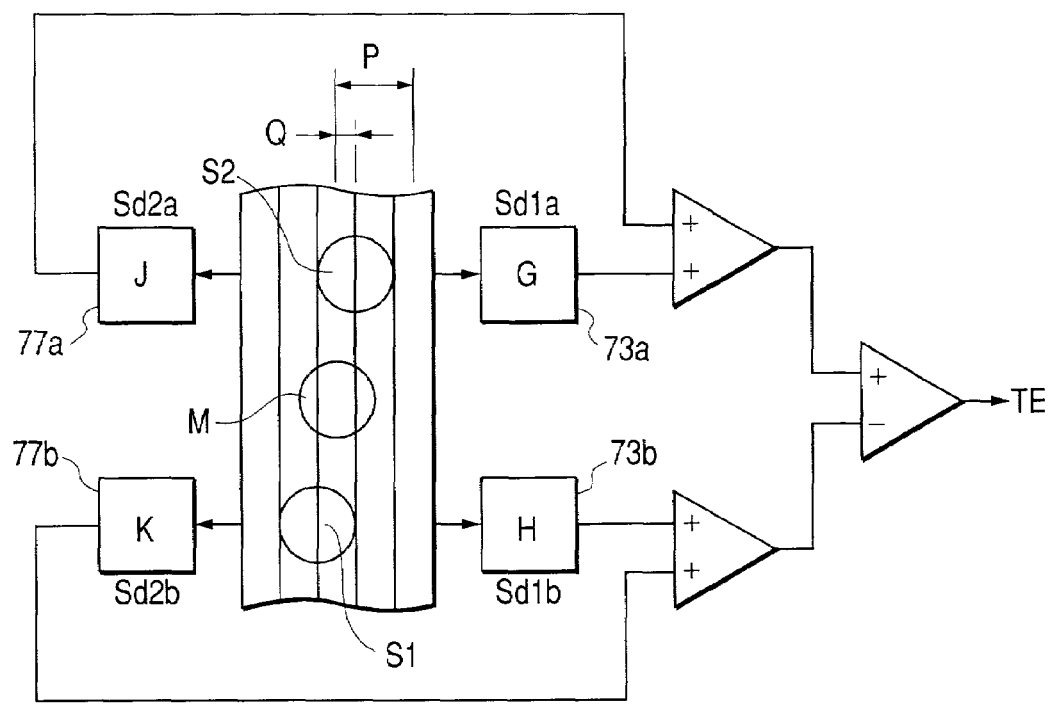
FIG. 9 is an operational illustration of a three-beam method.

Next, a three-beam method and a beam size method used in the first embodiment will be described on the basis of FIGS. 9 and 10. FIG. 9 is an operational illustration of the three-beam method, and FIG. 10 is an operational illustration of the beam size method.

In the three-beam method, as shown in FIG. 9, two sub-beam spots S1, S2 are offset by Q in the reverse direction with respect to a main beam spot M, respectively. The offset amount Q is set to about one fourth of a track pitch P. The reflected light by each of the sub-beam spots S1, S2 is incident on the hologram 63. The hologram 63, for example, detects each of the sub-beam spots Sd1a, Sd1b by + first-order light of the first laser beam at the sub-detectors 73a, 73b, respectively, and detects each of the sub-beam spots Sd2a, Sd2b by − first-order light of the first laser beam at the sub-detectors 77a, 77b, respectively. Then, when it is assumed that detection signals of each of the sub-detectors 73a, 73b, 77a, 77b are G, H, J, K, a tracking error TE signal is obtained by (G+J)−(H+K).

The three-division detectors 72, 76 for performing the beam size method are placed so that the division lines are parallel to a straight line connecting the first light emission source 36 and the second light emission source 40 of the semiconductor laser element 60, and beam spots of main beams are formed in the center of the three-division detectors 72, 76, respectively. The beam size method is a method for detecting a focus error FE signal by beam sizes of a pair of beam spots formed on the three-division detectors 72, 76 as shown in FIG. 10.

For example, when it is assumed that detection signal of each of division regions 72a, 72b, 72c, 76a, 76b, 76c of the three-division detectors 72, 76 are A, B, C, D, E, F, a focus error FE signal is obtained by (A+C+E)−(D+F+B).

Figure 10A:
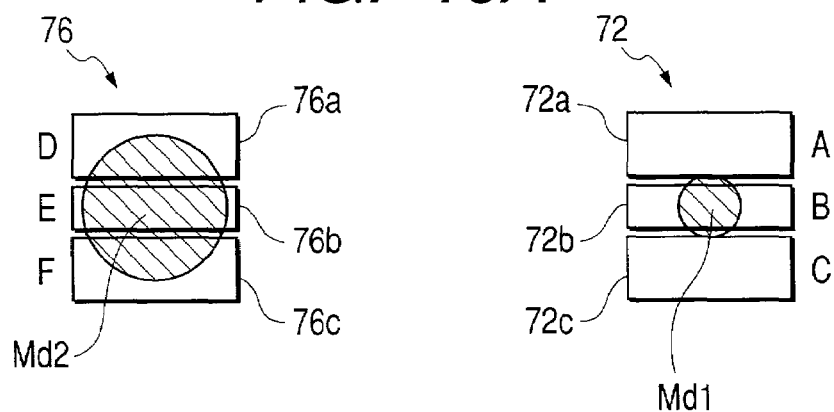
FIGS. 10A, 10B and 10C are operational illustrations of a beam size method.
Figure 10B:
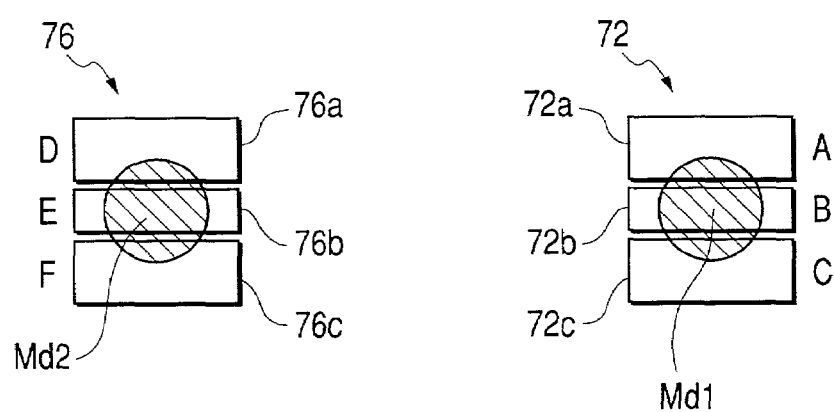

For instance, taking the first laser beam as an example, a pair of the three-division detectors 72, 76 set each of the division regions so that the sum of the detection signals (A+C) of the division regions 72a, 72c by the main beam Md1 of + first-order light is equal to the detection signal E of the division region 76b by the main beam Md2 of − first-order light, and set each of the division regions so that the sum of the detection signals (D+F) of the division regions 76a, 76c by the main beam Md2 of − first-order light is equal to the detection signal B of the division region 72b by the main beam Md1 of + first-order light, and thereby when focus is achieved, as shown in FIG. 10B, beam spots with the same size are applied to a pair of the three-division detectors 72, 76, so that (A+C+E) and (D+F+B) are equal to each other and the focus error signal is "0".

Figure 10C:
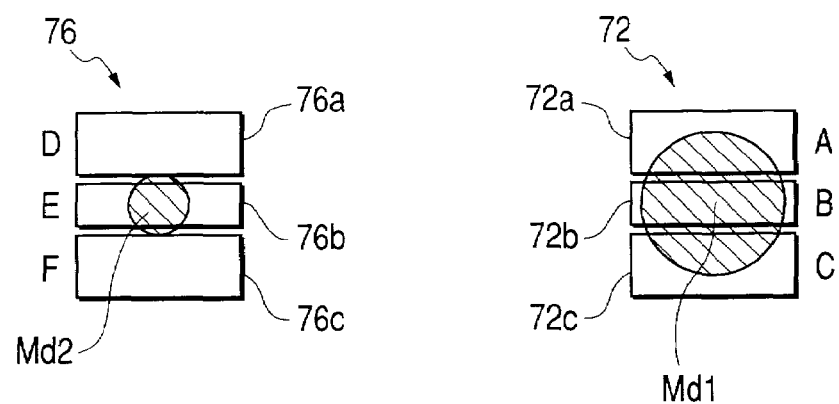

When focus is not achieved, as shown in FIG. 10A or FIG. 10C, the beam spot size of the main beam Md2 of − first-order light is different from the beam spot size of the main beam Md1 of + first-order light and both are applied and accordingly the focus error FE signal is generated. Then, an electrical signal is supplied to a demodulation circuit and an error detection circuit according to beam spot sizes formed on each of the division regions 72a, 72b, 72c, 76a, 76b, 76c of the three-division detectors 72, 76.

Incidentally, a reason for using (A+C+E)−(D+F+B) as the focus error signal is described as follows.

As described above, the hologram 63 focuses the +first-order light of the laser beam on a position where a focal length is f1 to form the beam spot of the + first-order light on the first light detection part 70, and focuses the – first-order light of the laser beam on the f2 to form the beam spot of the – first-order light on the second light detection part 75, and forms sizes of both beam spots equally. However, for example, there is a case that the beam spot size on the first light detection part 70 cannot be formed equally to the beam spot size on the second light detection part 75 due to a position relation between the hologram unit 120 and the light receiving/emitting part 80 or an error about setting of the hologram 63. Even in case that the sizes of the two beam spots are different somewhat from each other, since detection signals of a part of the light receiving regions of a pair of the three-division detectors 72, 76 for performing reciprocity operations can be captured mutually to set as an offset voltage of the focus error signal, an allowance for variations in manufacture or design can be increased.

As described above, since the optical pickup apparatus 200 according to the first embodiment comprises:

the semiconductor laser element 60 for emitting the first and second laser beams having different wavelengths from each other as the light emission part;

the first and second light detection parts 70, 75, in which the light receiving regions of the Y direction are enlarged somewhat, as the light receiving part; and the hologram unit 90 including the grating 62 and the hologram 63, the optical pickup apparatus corresponding to two wavelengths and enabling to achieve miniaturization without using the mixing prism can be realized.

Next, an optical pickup apparatus 200 according to a second embodiment of the invention will be described referring to FIGS. 11 and 12. A difference between the second embodiment and the first embodiment is that a semiconductor laser element 60 constructing a light receiving/emitting part 80 is inclined to the X direction in relation to a semiconductor substrate 71. For example, as shown in FIG. 12, the side of a first light emission source 36 of the semiconductor laser element 60 is inclined to the X direction with respect to the semiconductor substrate 71. The other configuration of the second embodiment is identical to that of the first embodiment.

Figure 11:
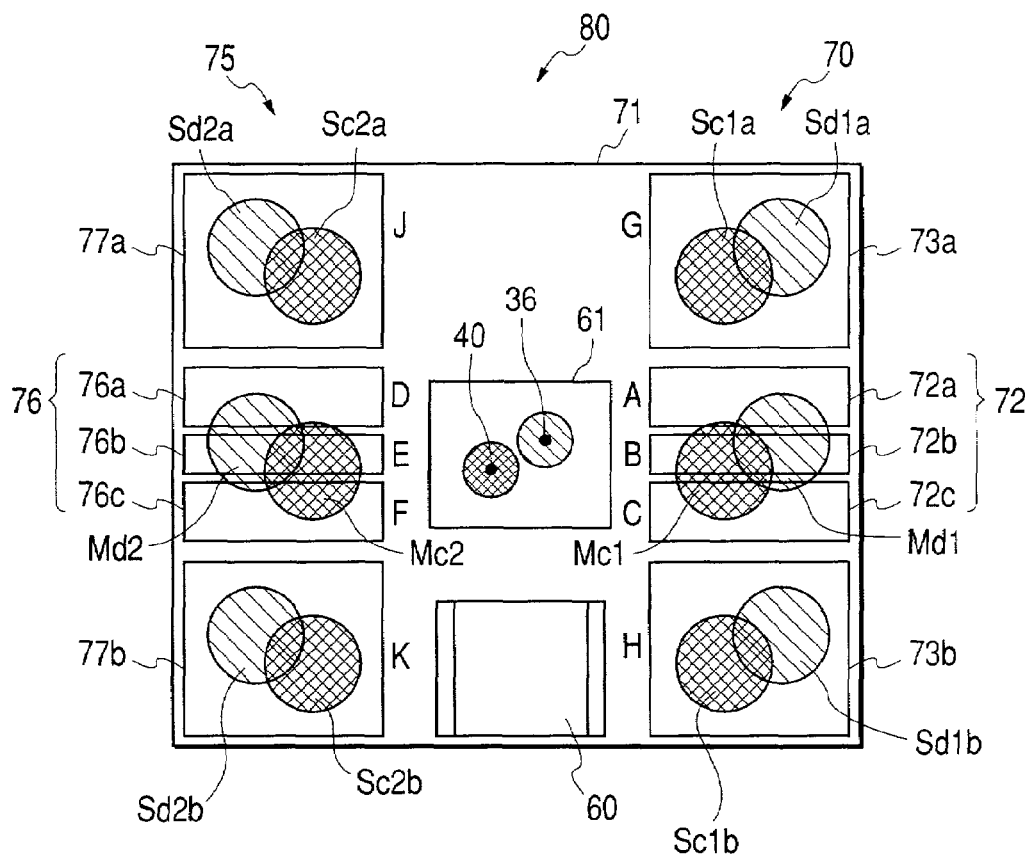
FIG. 11 is a plan view of a light receiving/emitting part constructing an optical pickup apparatus according to a second embodiment.
Figure 12:
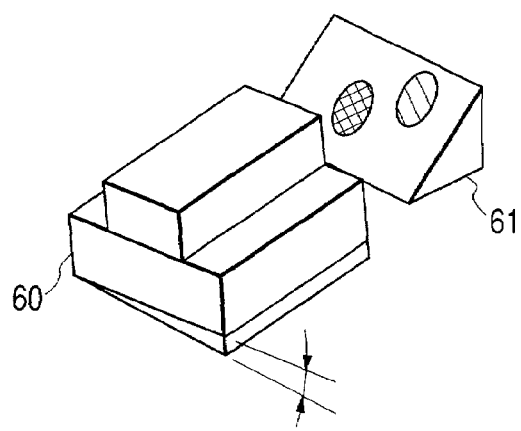
FIG. 12 is a perspective view showing a reflective mirror of the second embodiment.

Since the optical pickup apparatus 200 according to the second embodiment is constructed with the semiconductor laser element 60 inclined to the X direction with respect to the semiconductor substrate 71, as shown in FIG. 11, the main beam Md1 by the + first-order light of the first laser beam and the main beam Mc1 by the + first-order light of the second laser beam form beam spots at positions deviating in an opposite direction to each other along the Z direction from the center of the three-division detector 72. Similarly, the main beam Md2 by the – first-order light of the first laser beam and the main beam Mc2 by the – first-order light of the second laser beam also form beam spots at positions deviating in the opposite direction to each other along the Z direction from the center of the three-division detector 76.

That is, as shown also in FIG. 11, the Md1 and Md2 of the first laser beam deviate from the center of the three-division detectors 72, 76 to the same direction along the Z direction by the same distance and similarly, the Mc1 and Mc2 of the second laser beam deviate from the center of the three-division detectors 72, 76 to the same direction along the Z direction by the same distance. However, as described above, the focus error signal is generated by calculation of (A+C+E)−(D+F+B), so that an offset due to the position deviation of the beam spot is canceled by each other and a proper focus error signal can be obtained.

Since the optical pickup apparatus 200 according to the second embodiment can place positions of the first and second light emission source 36, 40 of the semiconductor laser element 60 on a diagonal line of a surface of the reflective mirror 61, a width of the Y direction of the reflective mirror 61 can be narrowed. Accordingly, right and left first and second light detection parts 70, 75 can be placed adjacent closer to the side of the semiconductor laser element 60 and the reflective mirror 61, so that a width (Y direction) of the light receiving/emitting part 80 can be reduced in comparison with the first embodiment.

Figure 13:
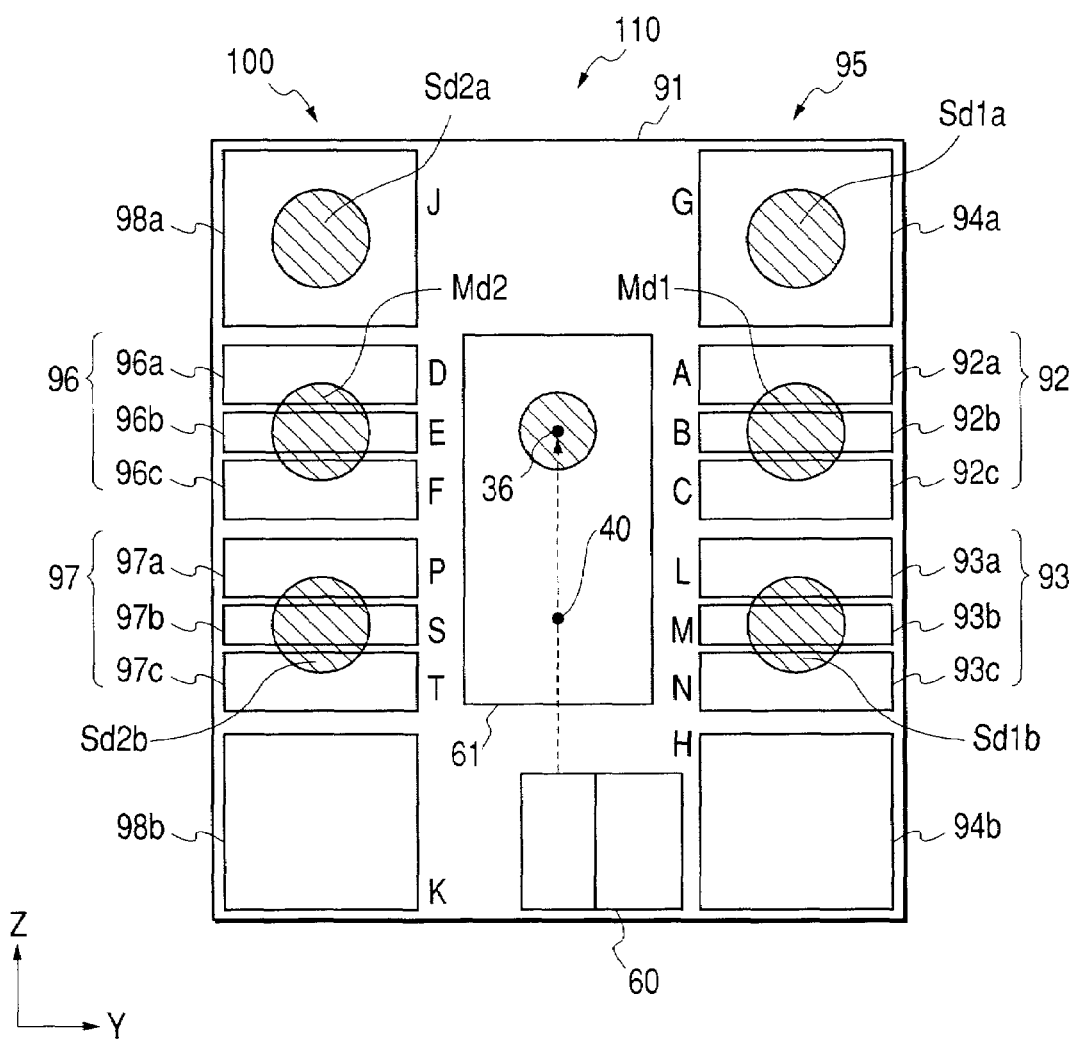
FIG. 13 is a plan view showing a light receiving/emitting part constructing an optical pickup apparatus according to a third embodiment when a DVD is reproduced.
Figure 14:
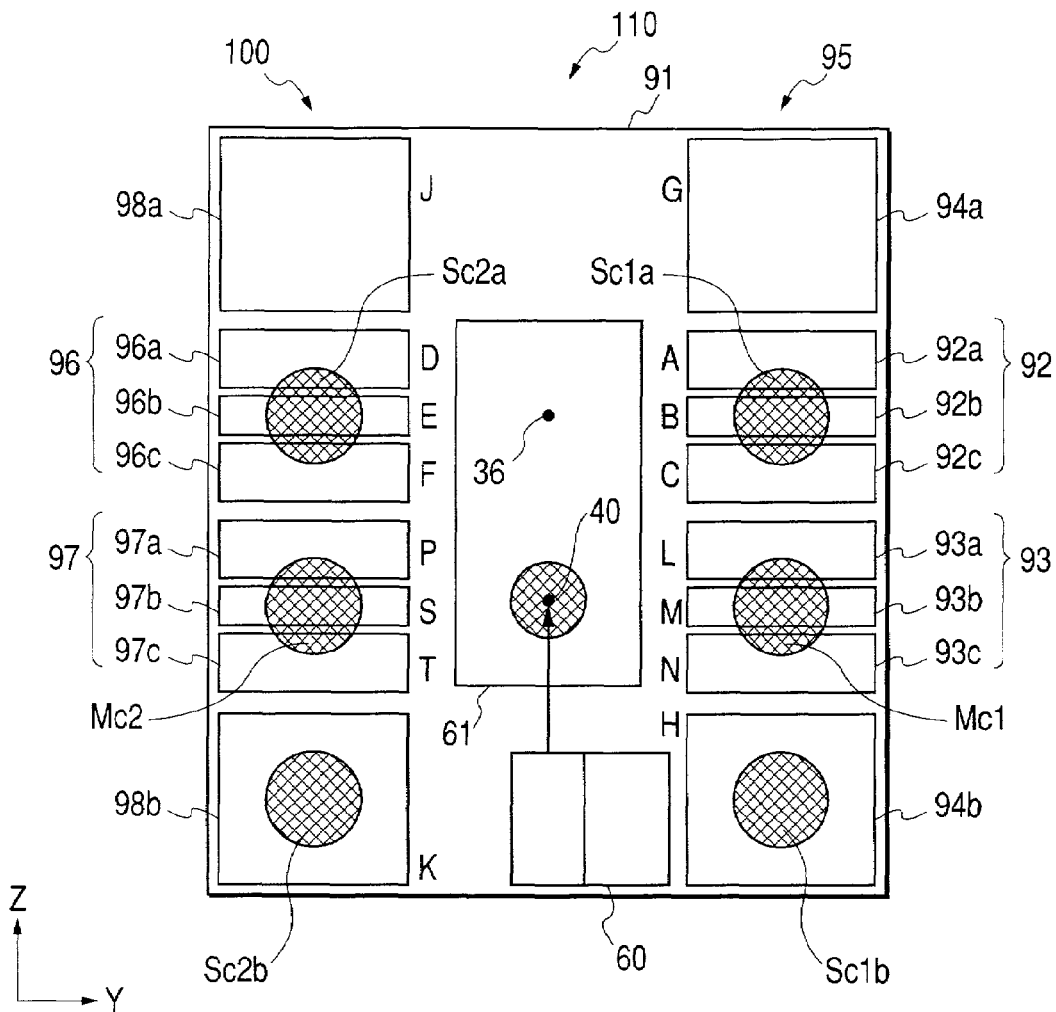
FIG. 14 is a plan view showing the light receiving/ emitting part constructing the optical pickup apparatus according to the third embodiment when a CD is reproduced.
Figure 15:
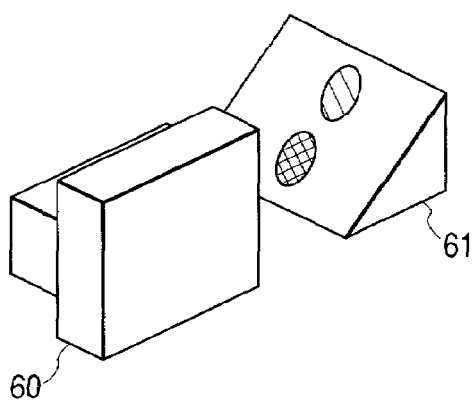
FIG. 15 is a perspective view showing a reflective mirror of the third embodiment.

Next, an optical pickup apparatus 200 according to a third embodiment of the invention will be described referring to FIGS. 13 to 15. FIGS. 13 and 14 are plan views of a light receiving/emitting part 110. FIG. 13 shows the case that each of beam spots Md1, Sd1a, Sd1b, Md2, Sd2a, and Sd2b by + first-order light and − first-order light of return light from a disk of a first laser beam is received to the light receiving/emitting part 110. FIG. 14 shows the case that each of beam spots Mc1, Sc1a, Sc1b, Mc2, Sc2a, and Sc2b by + first-order light and − first-order light of return light from the disk of a second laser beam is received to the light receiving/emitting part 110. FIG. 15 is a view showing a semiconductor laser element 60 and a reflective mirror 61 on the light receiving/emitting part 110.

A difference between the third embodiment and the first embodiment is to place the semiconductor laser element 60 so that the semiconductor laser element 60 stands in a perpendicular direction with respect to the semiconductor substrate 91, and whereby the first and second laser beams emitted from the semiconductor laser element 60 are aligned and placed in a longitudinal direction (X direction in the drawing) with respect to a surface of the reflective mirror 61. As a result, the light receiving/emitting part 110 of the third embodiment is different from the light receiving/emitting part 80 of the first embodiment in configuration. The other part of the third embodiment is the same as that of the first embodiment in configuration.

The light receiving/emitting part 110 used in the embodiment has a structure in which as shown in FIG. 15, the semiconductor laser element 60 is placed at an inclination of 90° with respect to the semiconductor substrate 91 and the reflective mirror 61 having a triangular cylinder shape is placed in front of the semiconductor laser element 60, and as shown in FIG. 13 or FIG. 14, a first light detection part 95 comprising two three-division detectors 92, 93 and a pair of sub-detectors 94a, 94b in both sides (Z direction) of the three-division detectors 92, 93 is placed in one side (Y direction of the right in the drawing) of the semiconductor laser element 60 and a second light detection part 100 comprising two three-division detectors 96, 97 and a pair of sub-detectors 98a, 98b in both sides (Z direction) of the three-division detectors 96, 97 is placed in the other side (Y direction of the left in the drawing) of the semiconductor laser element 60.

For example, in case of reproducing a DVD, as shown in FIG. 13, the main beam Md1 by the + first-order light of the first laser beam diffracted by the hologram 63 is applied to one of three-division detectors 92 and one of sub-beams Sd1a is applied to the sub-detector 94a and the other of sub-beams Sd1b is applied to the other of three-division detectors 93. The main beam Md2 by the − first-order light of the first laser beam diffracted by the hologram 63 is applied to one of three-division detector 96 and one of sub-beams Sd2a is applied to the sub-detector 98a and the other of sub-beams Sd2b is applied to the other three-division detectors 97. Division lines of right and left a pair of the three-division detectors 92, 96 for receiving the main beams of the + first-order light and the − first-order light of the first laser beam is placed so as to be parallel to a perpendicular direction with respect to a straight line connecting the first and second light emission sources 36, 40 of the semiconductor laser element 60. Thus, the main beams of the + first-order light and the − first-order light of the first laser beam form beam spots in the center of the three-division detectors 92, 96.

On the other hand, in case of reproducing a CD, as shown in FIG. 14, the main beam Mc1 by the + first-order light of the second laser beam diffracted by the hologram 63 is applied on one three-division detector 93 and one sub-beam Sc1a is applied on the other three-division detector 92 and the other sub-beam Sc1b is applied on the other sub-detector 94b. Also, the main beam Mc2 by the − first-order light of the second laser beam diffracted by the hologram 63 is applied on one three-division detector 97 and one sub-beam Sc2a is applied on the other three-division detector 96 and the other sub-beam Sc2b is applied on the other sub-detector 98b. A division line of right and left a pair of the three-division detectors 93, 97 for receiving the main beams of the + first-order light and the − first-order light of the second laser beam is placed so as to become parallel to a perpendicular direction with respect to a straight line for connecting the first and second light emission sources 36, 40 of the semiconductor laser element 60. Thus, the main beams of the + first-order light and the − first-order light of the second laser beam form beam spots in the center of the three-division detectors 93, 97.

Next, a calculation method of various signals in this embodiment will be described.

In the case of reproducing a DVD, as shown in FIG. 13, the main beams Md1, Md2 of the + first-order light and the − first-order light are applied to the three-division detectors 92, 96 as described in the first embodiment, so that (A+C+E)−(D+F+B) can be used as a focus error FE signal by each detection signal A, B, C, D, E, F of the three-division detectors 92, 96.

Also, one sub-beam Sd1b of the + first-order light is applied to one three-division detector 93, so that a result of calculating and summing detection signals L, M, and N of each receiving region 93a, 93b, and 93c of the three-division detector 93 can be regarded as an output of the sub-detector corresponding to the sub-detector 94a receiving the other sub-beam Sd1a. Similarly, one sub-beam Sd2b of the − first-order light is applied to one three-division detector 97, so that a result of calculating and summing detection signals P, S, and T of each receiving region 97a, 97b, and 97c of the three-division detector 97 can be regarded as an output of the sub-detector corresponding to the sub-detector 98a receiving the other sub-beam Sd2a. Thus, a tracking error TE signal can be obtained by (G+J)−((L+M+N)+(P+S+T)).

On the other hand, in the case of reproducing the CD, as shown in FIG. 14, the main beams Mc1, Mc2 of the + first-order light and the − first-order light are applied to the three-division detectors 93, 97, so that (L+N+S)−(P+T+M) can be used as the focus error FE signal by each detection signal L, M, N, P, S, T of the three-division detectors 93, 97.

Also, one sub-beam Sc1a of the + first-order light is applied to one three-division detector 92, so that a result of calculating and summing detection signals A, B, and C of each receiving region 92a, 92b, and 92c of the three-division detector 92 can be regarded as an output of the sub-detector corresponding to the sub-detector 94b receiving the other sub-beam Sc1b. Similarly, one sub-beam Sc2a of the − first-order light is applied to one three-division detector 96, so that a result of calculating and summing detection signals D, E, and F of each receiving region 96a, 96b, and 96c of the three-division detector 96 can be regarded as an output of the sub-detector corresponding to the sub-detector 98b receiving the other sub-beam Sc2b. Thus, the tracking error TE signal can be obtained by ((A+B+C)+(D+E+F))−(G+J).

According to the optical pickup apparatus 200 of the third embodiment, since positions of the first and second light emission sources 36, 40 of the semiconductor laser element 60 can be placed in a longitudinal direction with respect to a surface of the reflective mirror 61, a transverse width of the reflective mirror 61 can be narrowed further than the second embodiment. Accordingly, since right and left first and second light detection parts 95, 100 can be placed further closer to the side of the semiconductor laser element 60 and the reflective mirror 61, so that a width of the Y direction of the light receiving/emitting part 110 can be reduced remarkably in comparison with the first embodiment.

Figure 16:
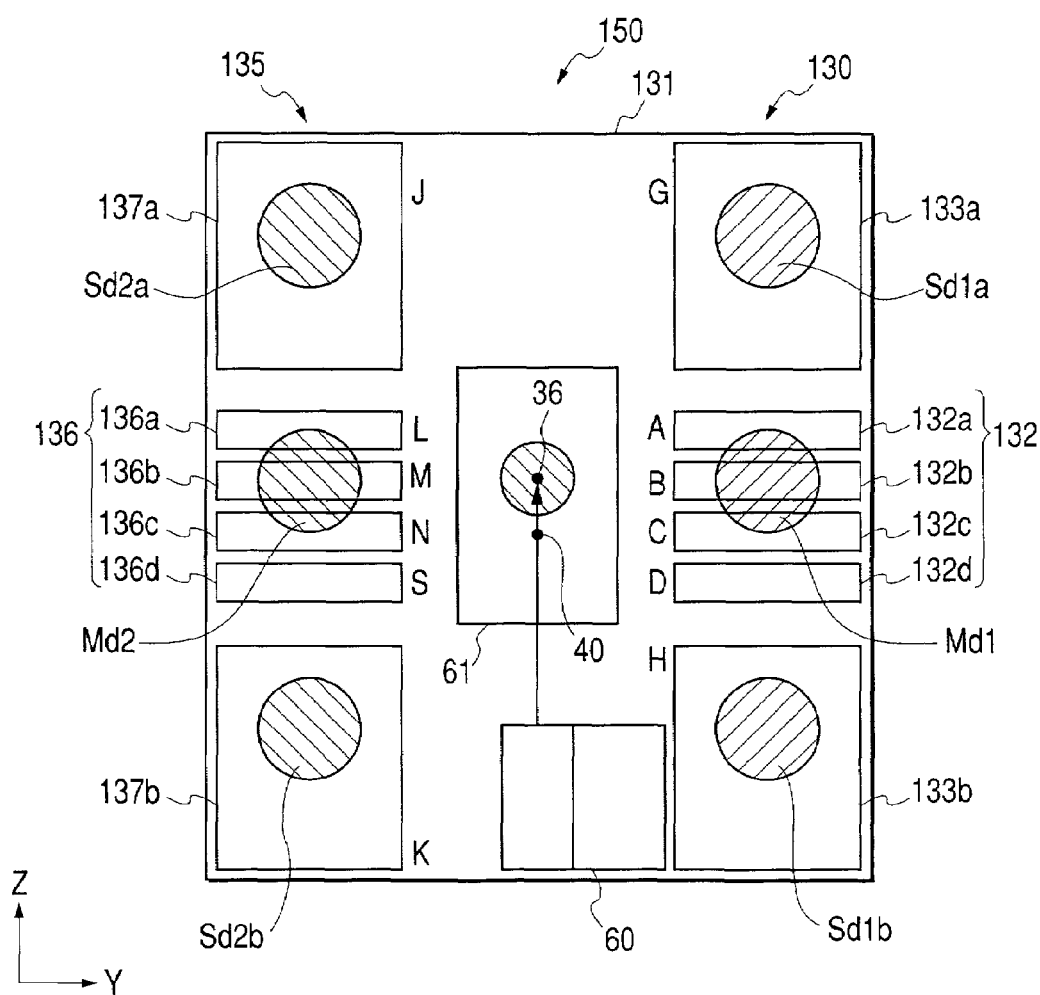
FIG. 16 is a plan view showing a light receiving/emitting part constructing an optical pickup apparatus according to a fourth embodiment when a DVD is reproduced.
Figure 17:
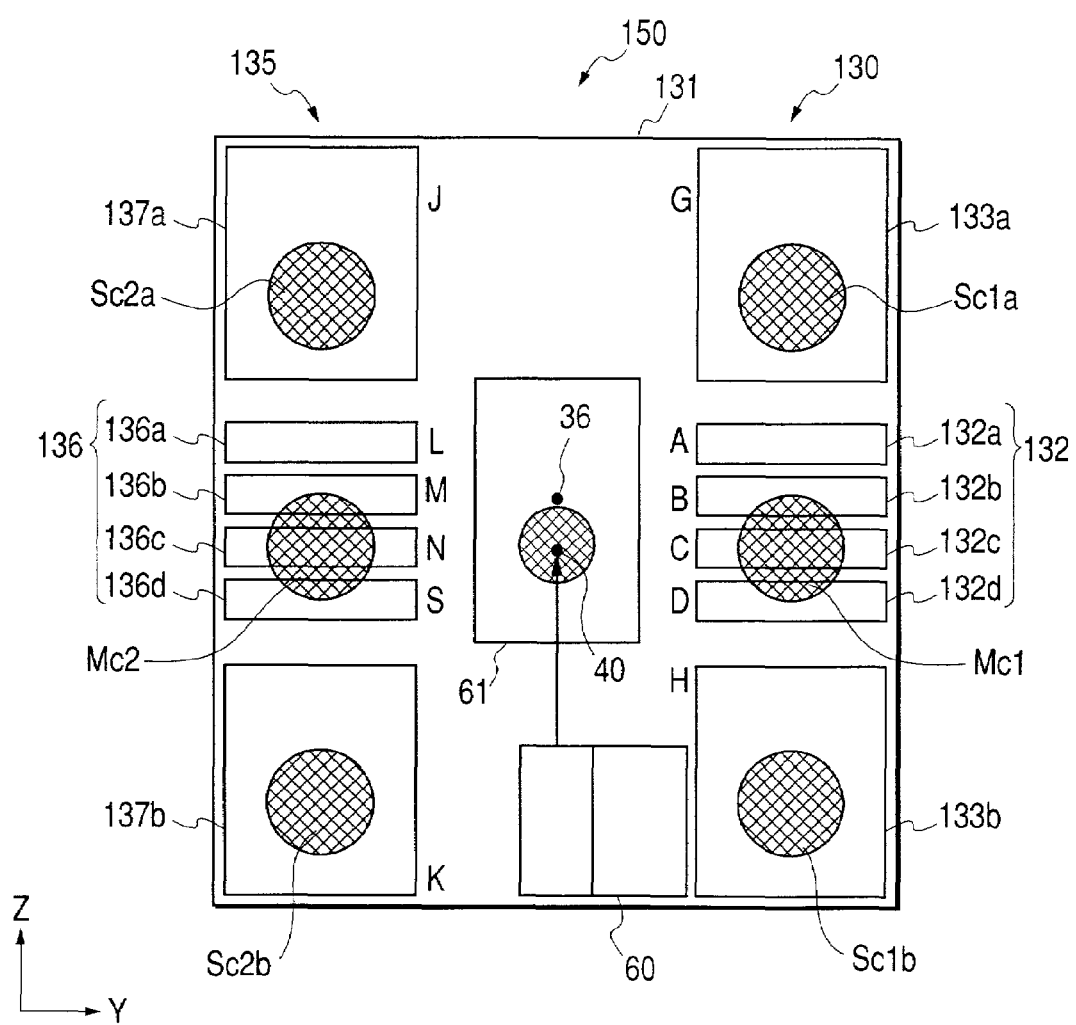
FIG. 17 is a plan view showing the light receiving/ emitting part constructing the optical pickup apparatus according to the fourth embodiment when a CD is reproduced.
Figure 18:
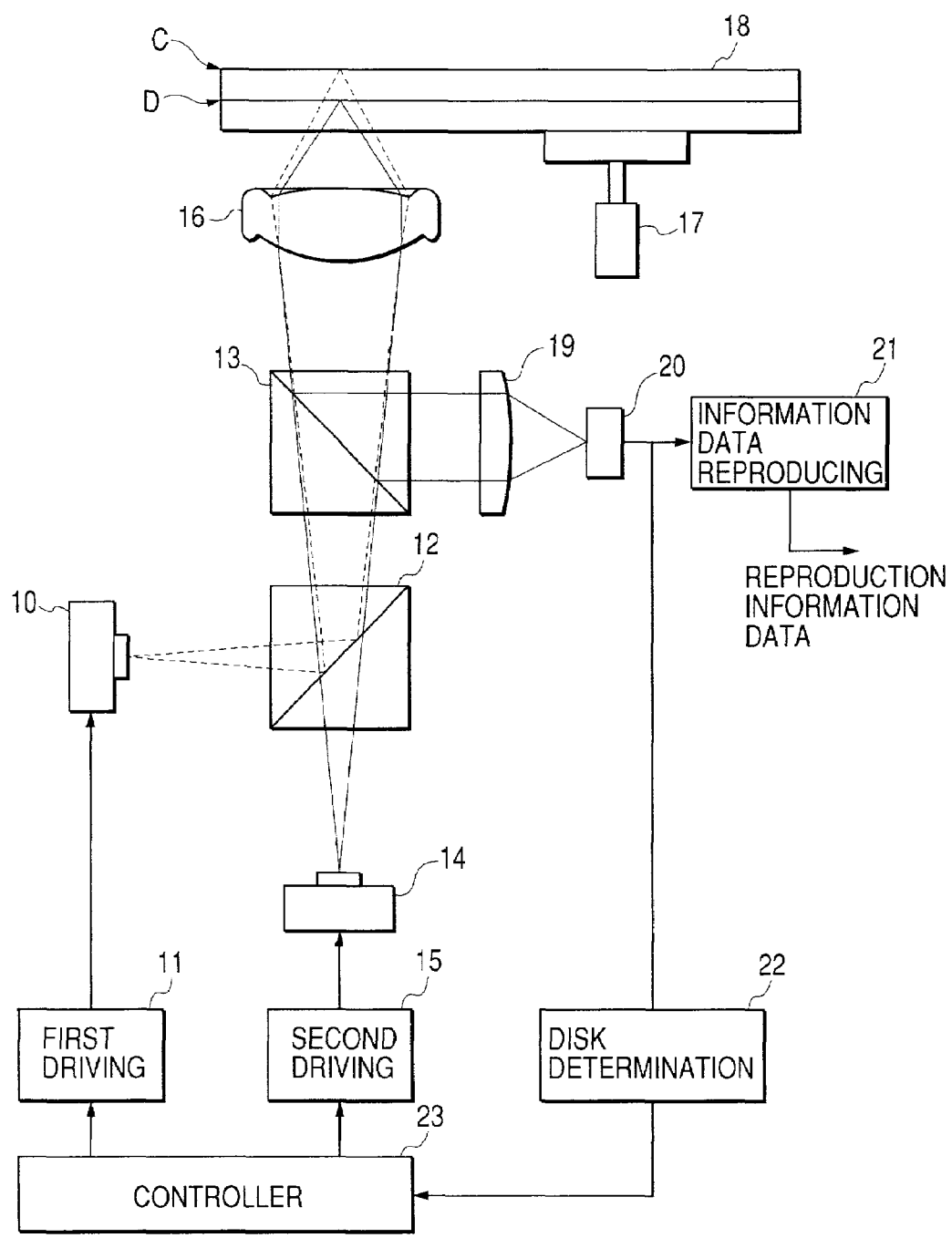
FIG. 18 is a configuration view of an optical pickup apparatus according to a related art.

Next, an optical pickup apparatus 200 according to a fourth embodiment of the invention will be described referring to FIGS. 16 and 17. FIGS. 16 and 17 are plan views of a light receiving/emitting part 150, and FIG. 16 shows a case that each beam spot Md1, Sd1a, Sd1b, Md2, Sd2a, and Sd2b by + first-order light and − first-order light of return light of a first laser beam from a disk is received, and FIG. 17 shows a case that each beam spot Mc1, Sc1a, Sc1b, Mc2, Sc2a, and Sc2b by + first-order light and − first-order light of return light of a second laser beam from the disk is received to the light receiving/emitting part 150. Incidentally, arrangement of a semiconductor laser element 60 and a reflective mirror 61 on the light receiving/emitting part 150 is identical to that of FIG. 15.

The fourth embodiment is an example in which the third embodiment described above is improved. Similar to the third embodiment, the semiconductor laser element 60 is placed with the semiconductor laser element 60 stood in a perpendicular direction with respect to a semiconductor substrate 71 so that the first and second laser beams emitted from the semiconductor laser element 60 are aligned and placed in a longitudinal direction (X direction in the drawing) with respect to a surface of the reflective mirror 61. As shown in FIGS. 16 and 17, the light receiving/emitting part 150 has a structure in which the semiconductor laser element 60 is placed at an inclination of 90° and the reflective mirror 61 having a triangular cylinder shape is placed in the front of the semiconductor laser element 60 and a first light detection part 130 comprising a four-division detector 132 and a pair of sub-detectors 133a, 133b in both sides (Z direction) of the four-division detector 132 is placed in one side (Y direction of the right in the drawing) of the semiconductor laser element 60 and a second light detection part 135 comprising a four-division detector 136 and a pair of sub-detectors 137a, 137b in both sides (Z direction) of the four-division detector 136 is placed in the other side (Y direction of the left in the drawing) of the semiconductor laser element 60.

The four-division detectors 132 and 136 include light receiving regions 132a, 132b, 132c, 132d and 136a, 136b, 136c, 136d divided into four portions as shown in the drawing, respectively. Division lines is arranged to be a perpendicular direction (Y direction in the drawing) with respect to a straight direction for connecting first and second light emission sources 36, 40 of the semiconductor laser element 60.

For example, in case of reproducing a DVD, as shown in FIG. 16, the main beam Md1 by the + first-order light of the first laser beam diffracted by the hologram 63 is applied on the continuously arranged three light receiving regions 132a, 132b, and 132c of the four-division detector 132 and one sub-beam Sd1a is applied on the sub-detector 133a and the other sub-beam Sd1b is applied on the sub-detector 133b. Also, the main beam Md2 by the − first-order light of the first laser beam diffracted by the hologram 63 is applied on the continuously arranged three light receiving regions 136a, 136b, and 136c of the four-division detector 136 and one sub-beam Sd2a is applied on the sub-detector 137a and the other sub-beam Sd2b is applied on the sub-detector 137b.

On the other hand, in case of reproducing a CD, as shown in FIG. 17, the main beam Mc1 by the + first-order light of the first laser beam diffracted by the hologram 63 is applied on the continuously arranged three light receiving regions 132b, 132c, and 132d of the four-division detector 132 and one sub-beam Sc1a is applied on the sub-detector 133a and the other sub-beam Sc1b is applied on the sub-detector 133b. Also, the main beam Mc2 by the − first-order light of the first laser beam diffracted by the hologram 63 is applied on the continuously arranged three light receiving regions 136b, 136c, and 136d of the four-division detector 136 and one sub-beam Sc2a is applied on the sub-detector 137a and the other sub-beam Sc2b is applied on the sub-detector 137b.

Next, a calculation method of various signals in the embodiment will be described.

In the case of reproducing the DVD, as shown in FIG. 16, the main beam Md1 is applied on the three light receiving regions 132a, 132b, 132c of the four-division detector 132 and the main beam Md2 is applied on the three light receiving regions 136a, 136b, 136c of the four-division detector 136, so that (A+C+M)−(L+N+B) can be used as a focus error FE signal by each detection signal A, B, C, L, M, N of the four-division detectors 132, 136. Also, a tracking error TE signal can be obtained by (G+J)−(H+K) similar to the first embodiment.

On the other hand, in the case of reproducing the CD, as shown in FIG. 17, the main beam Mc1 is applied on the three light receiving regions 132b, 132c, 132d of the four-division detector 132 and the main beam Mc2 is applied on the three light receiving regions 136b, 136c, 136d of the four-division detector 136, so that (B+D+N)−(M+S+C) can be used as the focus error FE signal by each detection signal A, B, C, L, M, N of the four-division detectors 132, 136. Also, the tracking error TE signal can be obtained by (G+J)−(H+K) similar to the first embodiment.

According to the optical pickup apparatus 200 of the fourth embodiment, similar to the third embodiment, a width of the Y direction of the light receiving/emitting part 150 can be reduced in comparison with the first embodiment, and further compared with the third embodiment, an area of the light receiving regions can also be reduced and further miniaturization can be achieved.

According to the invention, with respect to an optical pickup apparatus emitting first and second laser beams having each different wavelength and enabling to read a plurality of recording mediums having different reading wavelengths from each other, an optical system is integrated compactly and miniaturization of the optical pickup apparatus is achieved, and also light receiving elements are shared with reading of the first and second laser beams and thus, cost cutting by a reduction in the number of parts can be achieved.

What is claimed is:

1. An optical pickup apparatus enabling to read information of a plurality of recording mediums having different reading wavelengths from each other, comprising:
    a light emission part including a first light emission source for emitting a first laser beam and a second light emission source for emitting a second laser beam having a wavelength different from that of the first laser beam, the second light emission source integrally formed with the first light emission source and placed adjacent to the first light emission source, the light emission part controlled to selectively emit the first or second laser beam as a laser beam;
    a grating for generating a pair of sub-beams from the laser beam;
    a hologram for generating first high-order beams from the laser beam reflected by a recording medium and second high-order beams from the pair of the sub-beams reflected by the recording medium; and
    a light receiving part for receiving the first and second high-order beams to generate a reading signal, a focus error signal, and a tracking error signals
    wherein the light receiving part comprises:
    a first pair of three-division light receiving elements;
    a second pair of three-division light receiving elements;
    a first pair of sub-beam light receiving elements; and
    a second pair of sub-beam light receiving elements;
    when the first laser beam is emitted from the light emission part as the laser beam,
    the first pair of the three-division light receiving elements receive the first high-order beams to generate the reading signal and the focus error signal;
    the first pair of the sub-beam light receiving elements receive the second high-order beam generated from one of the pair of the sub-beams;
    the second pair of the three-division light receiving elements receive the second high-order beams generated from the other of the pair of sub-beams; and
    the first pair of the sub-beam light receiving elements and the second pair of the three-division light receiving elements generate the tracking error signal; and
    when the second laser beam is emitted from the light emission part,
    the first pair of the three-division light receiving elements receive the second high-order beams generated from one of the pair of the sub-beams;
    the second pair of the three-division light receiving elements receive the first high-order beams to generate the reading signal and the focus error signal;
    the second pair of the sub-beam light receiving elements receive the second high-order beams generated from the other of the pair of sub-beams; and
    the first pair of the three-division light receiving elements and the second pair of the sub-beam light receiving elements generate the tracking error signal.

2. The optical pickup apparatus according to claim 1 wherein the focus error signal is generated by a beam size method; and
    the tracking error signal is generated by a three-beam method.

3. The optical pick up apparatus according to claim 1, wherein the light receiving part comprises:
    a pair of three-division light receiving elements; and
    two pairs of sub-beam receiving elements;

the pair of three-division light receiving elements receive the first high-order beams to generate the reading signal and the focus error signal; and the two pairs of sub-beam light receiving elements are provided by one pair with respect to each of the three-division light receiving elements, and receive the second high-order beams to generate the tracking error signal.

4. The optical pickup apparatus according to claim 3, wherein each of the three-division light receiving elements is divided into three light receiving regions by two parallel division lines; and each pair of the sub-beam light receiving elements is aligned and placed in a direction perpendicular to the division lines of the three-division light receiving elements.

5. The optical pickup apparatus according to claim 4, wherein the light emission part is placed so that a straight line connecting light emission points of the first and second light emission sources is parallel to the division lines of the three-division light receiving element.

6. The optical pickup apparatus according to claim 4, wherein the hologram is placed so that a straight line connecting incident points of the first high-order beams onto the light receiving part is parallel to the division lines of the three-division light receiving elements.

7. The optical pickup apparatus according to claim 4, wherein the grating is placed so that a straight line connecting the pair of sub-beams is perpendicular to the division lines of the three-division light receiving elements.

8. The optical pickup apparatus according to claim 1, wherein the light emission part is placed so that a straight line connecting light emission points of the first and second light emission sources is perpendicular to a surface on which the light receiving part is provided.

9. The optical pickup apparatus enabling to read information of a plurality of recording mediums having different reading wavelengths from each other, comprising:

a light emission part including a first light emission source for emitting a first laser beam and a second light emission source for emitting a second laser beam having a wavelength different from that of the first laser beam, the second light emission source integrally formed with the first light emission source and placed adjacent to the first light emission source, the light emission part controlled to selectively emit the first or second laser beam as a laser beam;

a grating for generating a pair of sub-beams from the laser beam;

a hologram for generating first high-order beams from the laser beam reflected by a recording medium and second high-order beams from the pair of the sub-beams reflected by the recording medium; and a light receiving part for receiving the first and second high-order beams to generate a reading signal, a focus error signal, and a tracking error signal, wherein the light receiving part comprises:

a pair of four-division light receiving elements for receiving the first high-order beams to generate the reading signal and the focus error signal; and two pairs of sub-beam light receiving elements provided by one pair with respect to each of the pair of the four-division light receiving elements, the two pairs of sub-beam light receiving elements for receiving the second high-order beams to generate the tracking error signal, the first high-order beams are received by continuous three light receiving regions of the four-division light receiving elements; and the continuous three light receiving regions for receiving the first high-order beams generated from the first laser beam are different in part from those for receiving the first high-order beams generated from the second laser beam.

10. The optical pickup apparatus according to claim 9, wherein the light emission part is placed so that a straight line connecting light emission points of the first and second light emission sources is perpendicular to a surface on which the light receiving part is provided.

* * * * *